US007925897B2

(12) United States Patent
Nair (10) Patent No.: US 7,925,897 B2
(45) Date of Patent: Apr. 12, 2011

(54) SYSTEM, METHOD AND APPARATUS FOR CONTROLLING THE DISSEMINATION OF DIGITAL WORKS

(76) Inventor: Mark Nair, Amarillo, TX (US)

( * ) Notice: Subject to any disclaimer, the term of this patent is extended or adjusted under 35 U.S.C. 154(b) by 1020 days.

(21) Appl. No.: 11/240,534

(22) Filed: Oct. 3, 2005

(65) Prior Publication Data

US 2006/0080741 A1    Apr. 13, 2006

Related U.S. Application Data

(63) Continuation of application No. 09/810,957, filed on Mar. 16, 2001, now abandoned.

(60) Provisional application No. 60/190,268, filed on Mar. 17, 2000.

(51) Int. Cl.
*G06F 11/30*    (2006.01)

(52) U.S. Cl. ............ 713/194; 713/189; 726/26; 726/27; 726/28; 380/277; 380/45

(58) Field of Classification Search .................. None
See application file for complete search history.

(56) References Cited

U.S. PATENT DOCUMENTS

| 5,355,302 | A | 10/1994 | Martin et al. | |
|---|---|---|---|---|
| 5,572,442 | A | 11/1996 | Schulhof et al. | |
| 5,719,937 | A | 2/1998 | Warren et al. | |
| 5,721,951 | A | 2/1998 | DorEl | |
| 5,930,765 | A | 7/1999 | Martin | |
| 5,959,945 | A | 9/1999 | Kleiman | |
| 5,969,283 | A | 10/1999 | Looney et al. | |
| 6,248,946 | B1 | 6/2001 | Dwek | |
| 6,289,455 | B1 * | 9/2001 | Kocher et al. | 713/194 |
| 6,328,570 | B1 | 12/2001 | Ng | |
| 6,480,961 | B2 | 11/2002 | Rajasekharan et al. | |
| 6,560,651 | B2 | 5/2003 | Katz et al. | |
| 7,362,861 | B2 * | 4/2008 | Yacobi et al. | 380/213 |

FOREIGN PATENT DOCUMENTS

| EP | 0926644 | 6/1988 |
|---|---|---|
| EP | 0933901 | 8/1999 |
| WO | WO 96/12257 | 4/1996 |

OTHER PUBLICATIONS

Hoffman, "IEEE 1394, the A/V Digital Interface of Choice," pp. 1-4, http://www.skipstone.com/newspap.html (1996).

* cited by examiner

*Primary Examiner* — Pramila Parthasarathy
(74) *Attorney, Agent, or Firm* — Raymond Van Dyke (57) ABSTRACT

A system, business methodology and apparatus for facilitating controlled dissemination of digital works is disclosed. An audio and video organizer, entertainment, and communication unit that plays back audio and video media content received from a central storage server. The unit relies on a smartcard, which has a personalized key that unlocks encrypted content. Using the unit, a user can purchase music or other types of media using a appropriate ordering method. The central storage server then transmits a double-encrypted, compressed audio file to the unit, where it is decrypted based on the smartcard key, and available for listening.

5 Claims, 12 Drawing Sheets

SYSTEM, METHOD AND APPARATUS FOR CONTROLLING THE DISSEMINATION OF DIGITAL WORKS

CROSS-REFERENCE TO RELATED APPLICATIONS

This patent application is related to and claims priority from U.S. patent application Ser. No. 09/810,957, which in turn is related to and claims priority from U.S. Provisional Patent Application No. 60/190,268, filed Mar. 17, 2000.

BACKGROUND OF THE PRESENT INVENTION

1. Field of the Invention

The present invention is directed to improvements in home entertainment systems, particularly, to a system, method and apparatus for facilitating the usage of digital works.

2. Description of the Related Art

The growth of the Internet as a communication tool has been phenomenal. With the increasing usage of the Internet as a platform for business, staid industries are having to reinvent themselves to keep ahead of or keep pace with this technological wave.

The music industry has had to cope with advances in technology impinging upon artists' royalties and controlled dissemination. Prior to the invention of the Internet and its rise in massive popularity, digital music was distributed in fairly traditional ways. Music was recorded and then mastered and pressed to compact disc, which then acted as the physical medium that consumers purchased. Compact discs, by their nature, are limited to reproducing original mastered music at 44.1 kHz, but this reproduction offered the closest digital copy of the master that had ever been previously possible. To copy this music to another format for use on another unit besides a compact disc player, such as a cassette player, a person would have to make an analog recording of the music, usually on a cassette recorder that is physically attached to the audio out ports on the compact disc player. Digital Analog Tape and the MiniDisc faced similar limitations, namely the digital audio from the source had to be converted, at some point, to an analog signal for transfer to these mechanisms.

Personal computers offered a solution to this archival problem. Computers are able to read the music off a compact disc and then, using various software, can extract or "rip" the audio content from the CD for storage on the computer's hard drive. The majority of these ripping techniques still transferred the audio through a digital to analog to digital method, but some extractors kept the digital signal from beginning of extract to the end of archiving. This meant that a computer could save a large amount of compact disc content on a storage unit that allowed almost instantaneous access to individual songs from separate compact discs. Unfortunately, the file sizes of these songs were very large; a single song could easily require 50 megabytes of hard drive space. An entire CD could occupy 650 megabytes.

To ease this storage problem, several compression mechanisms and formulations were quickly introduced, the most popular being MPEG II layer III, commonly known as MP3. Audio content compressed using the mp3 format could shrink in size to a tenth of its original with arguably little or no loss in quality from the compact disc master. At the same time, the Internet's progression and connection to millions of personal computers enabled people to share their music files with each other, although this was at first a difficult exercise since one computer would need the physical address of another computer to transfer files. Services such as public anonymous File Transfer Protocol (FTP) sites, digital bulletin board services, and client-based server programs such as Hotline, acted as conduits and repositories for this compressed music, but most of these services were underground and difficult for the average user to find, much less operate.

The advent of peer-to-peer file sharing made transferring digital music files between disparate computers on the Internet a trivial matter. Peer-to-peer technology allows one computer to broadcast its list of music files to either a centralized computer that maintains an index of files or broadcast its ability to share files, which other computers on the network, or node of the network, recognize and then build their own index. Peer-to-peer file sharing avoids placing the physical media on one central server or bank of computer servers, but rather allows each computer on the file sharing network to act as its own server, limited by its own connection to the Internet and its own computer processing power. Since peer-to-peer file sharing basically allows for an anonymous transfer of files from one computer to another with no layer in between and, regardless of the software facilitating the service and creating the index, makes it a very simple matter to find and exchange files, the technology by its very existence aids copyright infringement by its population of users, which in turn undermines the financial incentive for artists to continue creating original works of art.

The Internet and file sharing, however, are now technologies embraced by millions and millions of users and the thought of reverting to a closed technological system of recording compact discs to analog recordings is most certainly unacceptable. Conflicting with this methodology of sharing files are the artists and music labels who have a great interest in protecting their work from illegal copying and distribution. At the same time sharing video content, which is still in its infancy because of compression techniques, requires a method that will protect the original content yet retain the simplicity of peer-to-peer sharing.

The ease of copying digital works has resulted in a dilemma to copyright owners in a work, such as music encoded per MP3, i.e., how to utilize this new digital medium but maintain control over the work? In other words, the music industry and the artists are trying to prevent unlicensed dissemination of the work.

There is, therefore, a need for a system, method and apparatus that facilitates the dissemination of a protected digital work while at the same time maintaining control over its dissemination.

SUMMARY OF THE INVENTION

Embodiments of the present invention overcome shortcomings of prior systems and satisfy a need for providing a method and system for distributing digital audio and video content to users that supersede the aforementioned peer-to-peer file sharing technique and also ensures that each distributed digital file is protected from rampant copying or illicit distribution.

The present invention is directed to a system, business methodology and apparatus for facilitating controlled dissemination of digital works. An audio and video unit (hereinafter "unit") plays back audio and video media content received from a central storage server. The unit includes a storage unit for storing downloaded digital media files, and a media processing element for generating only analog versions of selected media files of the stored digital media files and outputting only the analog versions. In this way, exact duplicates of downloaded media files stored in the unit are not available for widespread distribution.

The unit further includes a card reader for retrieving an electronic value from a card, such as a smartcard, inserted in the card reader. The electronic value is used to generate the analog versions of the digital media files, such as by decrypting the digital files based upon the electronic value. As a result, only units having the appropriate card inserted therein are able to output analog versions of the digital media

BRIEF DESCRIPTION OF THE DRAWINGS

A more complete understanding of the system, method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The unit according to a preferred embodiment of the present invention contains digital media in a local, closed system that can receive a digital file and then playback the file through analog connections. The unit, sometimes referred to as player unit, is controlled by a central microprocessor and has networking connections. It also has an audio and video output connections and an interface for digital cameras. All media is stored in the unit on an internal hard drive.

Figure 1:
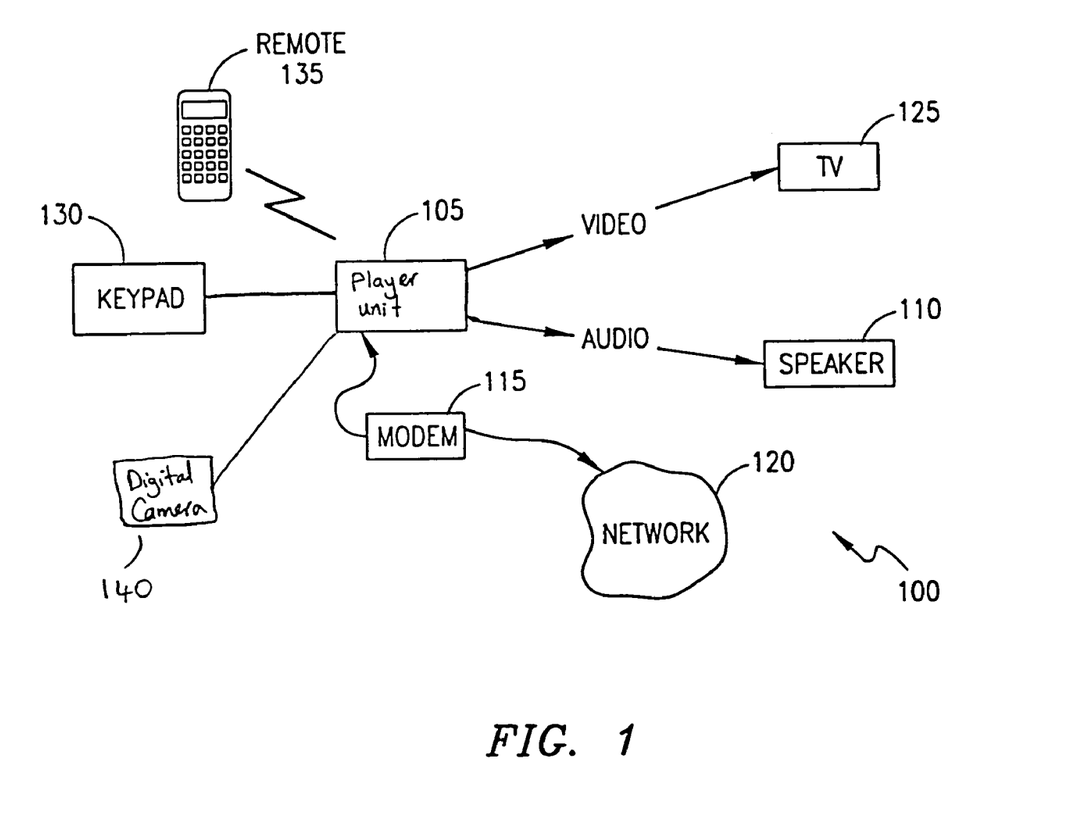
FIG. 1 illustrates a presently preferred configuration of the system and apparatus of the present invention.

With reference now to FIG. 1 of the Drawings, there is illustrated a presently preferred system, generally designated by the reference numeral 100, that implements the principles of the present invention. As shown, a player unit 105, for playing the digital music (as well as non-digital music or any digital work) may represent a tabletop unit for the home or a handheld unit. In order to control improper dissemination of protected works, player unit 105 has no digital output ports or connections, thereby preventing or at least hindering the copying of any digital downloaded copyrighted digital works. Player unit 105 does, however, have an audio analog output, such as to a speaker 110, which may be a separate component or integral with player unit 105, by which to play a previously downloaded digital work.

Preferably, the sole source of digital communication with player unit 105 is via a modem 115, which may also be a separate component or integral to the player unit 105. As shown in FIG. 1, modem 115 connects the player unit 105 to a network 120 via TCP/IP or other communications protocols. The player unit 105 may also have a video output to suitably connect to a television or computer monitor 125 for reviewing the musical contents stored within the player unit 105.

With the growing convergence of appliances and computers, it should be apparent that player unit 105 need not connect to a computer to access the network 120 and a consumer may instead connect to the network 120 directly from unit 105. For example, the consumer may download digital files stored on the network 120 directly into the player unit 105 via the modem 115. In particular, the consumer may use player unit 105 to access a music website or other Internet repository to obtain copyrighted digital works, e.g., from an Internet music club. It is understood that even though unit 105 is not a conventional web browser used by a general purpose computer to access the Internet, it is nonetheless capable of navigating a web site and downloading media therefrom. The consumer could control the downloading via a keypad 130 attached or integral with the player unit 105 or a remote 135, e.g., typing or keying-in an identifier corresponding to a desired selection, which could be identified in a club booklet of available titles. The desired music/audio files would then be downloaded from the music seller to the player unit 105.

Player unit 105 preferably has enough memory storage therein to hold a considerable amount of audio and/or media files, e.g., five hundred CD's worth. By way of the video link to the television 125, the consumer may catalog and navigate through the one or more databases and/or libraries of music and/or audio files stored within the user's player unit 105, i.e., on a memory therein. Since no digital copies can be made from the downloaded file, e.g., backup memory storage within the player unit 105 is fixed, meaning that deletion of stored songs may be needed to store a current selection, thereby making music a commodity rather than a collectible.

As should be understood, hard drive space is finite, which necessities a user to delete music or video files from their personal catalog. This does not mean that the media is no longer available. It simply is a way to clear up more space on their local unit. The user does not need to re-purchase the songs, since the entire catalog of purchased music is always stored safely at the central media server.

Unit 105 gives a user the ability to download audio and video content from a central server in network 120 to a unit. The media is protected from relatively simple mass duplication by a double-encryption methodology on the player unit that is keyed to the media, as will be explained in detail hereinafter.

The player unit 105, according to a preferred embodiment of the present invention, may include a processing element, such as a microprocessor, that runs a media-centric operating system whose function is to decode and play back audio and video content, which is stored on an internal hard drive within unit 105.

Figure 2:
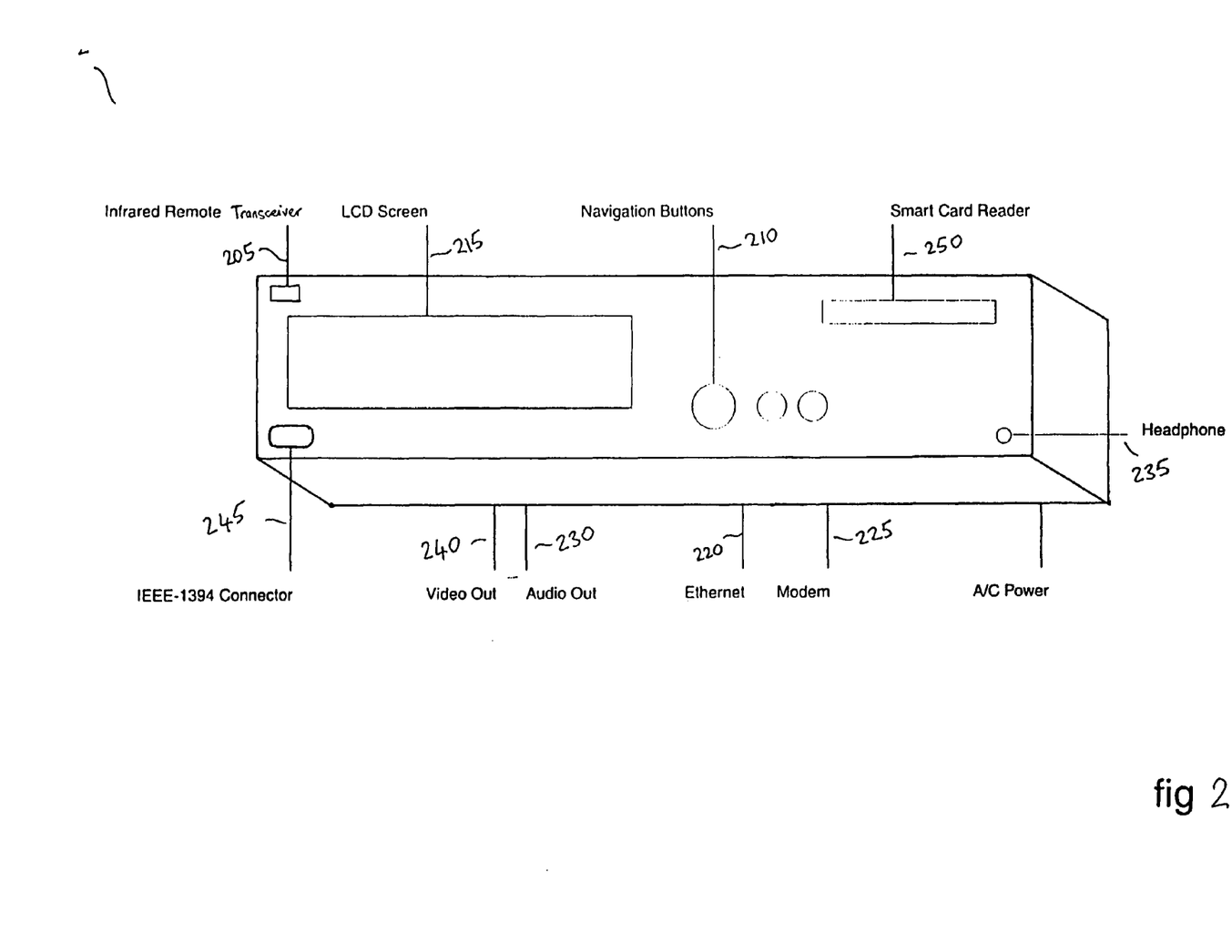
FIG. 2 illustrates a preferred embodiment of the player unit (console version) of the present invention.

FIG. 2 illustrates a console version of the player unit, generally designated by the reference numeral 200. The user accesses and controls the stored content using either a remote control that communicates to the player unit 200 through the infrared remote receiver port 205 or using the navigation and control buttons 210 on the front of the unit. These buttons 210 allow the user to navigate entirely through one or more libraries of content (media files) on the unit, select a particular media file, begin playing the media file, suspend play of the media file, stop playback and other functionalities such as setting an equalizer, controlling the volume, adjusting the balance, etc. A display 215, which can be a variation of liquid crystal display (LCD), light emitting diode (LED), or a stimulated plasma display, shows the name of the music track of the media file selected, the time remaining in the track, the artist of the track, and any ancillary information that may be relevant to the user.

The unit has several interfaces to connect to other equipment. The unit, according to a preferred embodiment of the present invention has both a 10/100 Base-T Ethernet connection 220 and a modem connection 225 to link to the network 120 and download files therefrom. Audio is played back through RCA audio out port 230 or a headphone jack 235. Video, which is either video content or menu navigation screens, is played back through the RCA video out connection 240. An IEEE-1394 (245) interface allows the connection of digital video cameras to the unit 200. A smartcard interface 250 reads the smartcard that will unlock the encrypted music and video content for the particular user and unit.

Figure 3:
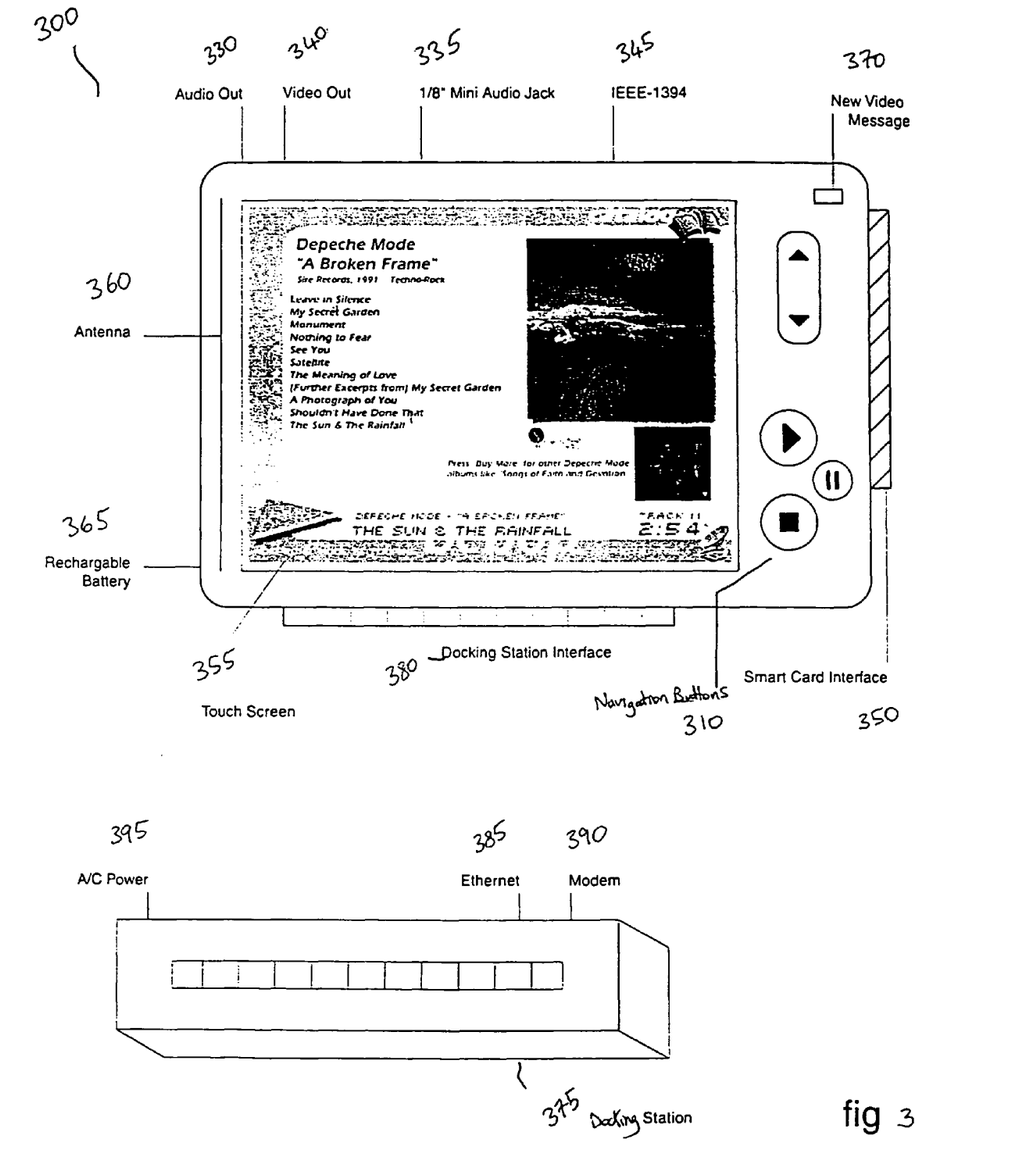
FIG. 3 illustrates a preferred embodiment of the player unit (portable version) of the present invention.

FIG. 3 illustrates a portable version of the player unit, generally designated by the reference numeral 300. Similar to the console version described with reference to FIG. 2, this version contains an RCA audio out port 330, an RCA video out port 340, an IEEE-1394 interface 345, a smartcard interface 350, and navigation buttons 310. This version of the unit also contains an ⅛ inch mini audio out connection 335 for headphones. The screen is touch-sensitive 355, so the user merely has to touch the screen to navigate the catalog and/or database of media files stored in the unit. This version of the unit contains antennae 360 hidden within the sides of the unit, a rechargeable battery 365 for power, and a new message light 370 to warn of new video content or messages on the unit.

The portable unit communicates to the server in the network by using a docking station 375. When the user wishes the unit to download new media, the unit is inserted into docking station 375 by pushing the unit therein so that the docking station interface 380 of the unit attaches solidly to the docking station. The docking station 375 may include both a 10/100 Base-T Ethernet connection 385 and a modem connection 390 as well as an A/C power supply 395 to recharge the battery 365 in the portable unit.

The user can navigate audio and video content using a television attached to the video out connection. Here users can search their own catalogs, make play lists, read biographical information, view artwork, and customize their jukeboxes according to their preference. The television is the control hub for the unit, although a user can easily navigate their music and video collection without it. The television, however, provides a more entertaining and easy navigating experience.

The unit also allows an easily accessible catalog of media on a server that the user can access and download simply and quickly. According to a preferred embodiment of the present invention a user has three alternative ways to find and retrieve media from a server: by using a web browser on a personal computer to search through a web-based media, find and then order the media using the same environment, by using a physical catalog mailed to the user, and by navigating the central media server library from the unit.

Figure 4:
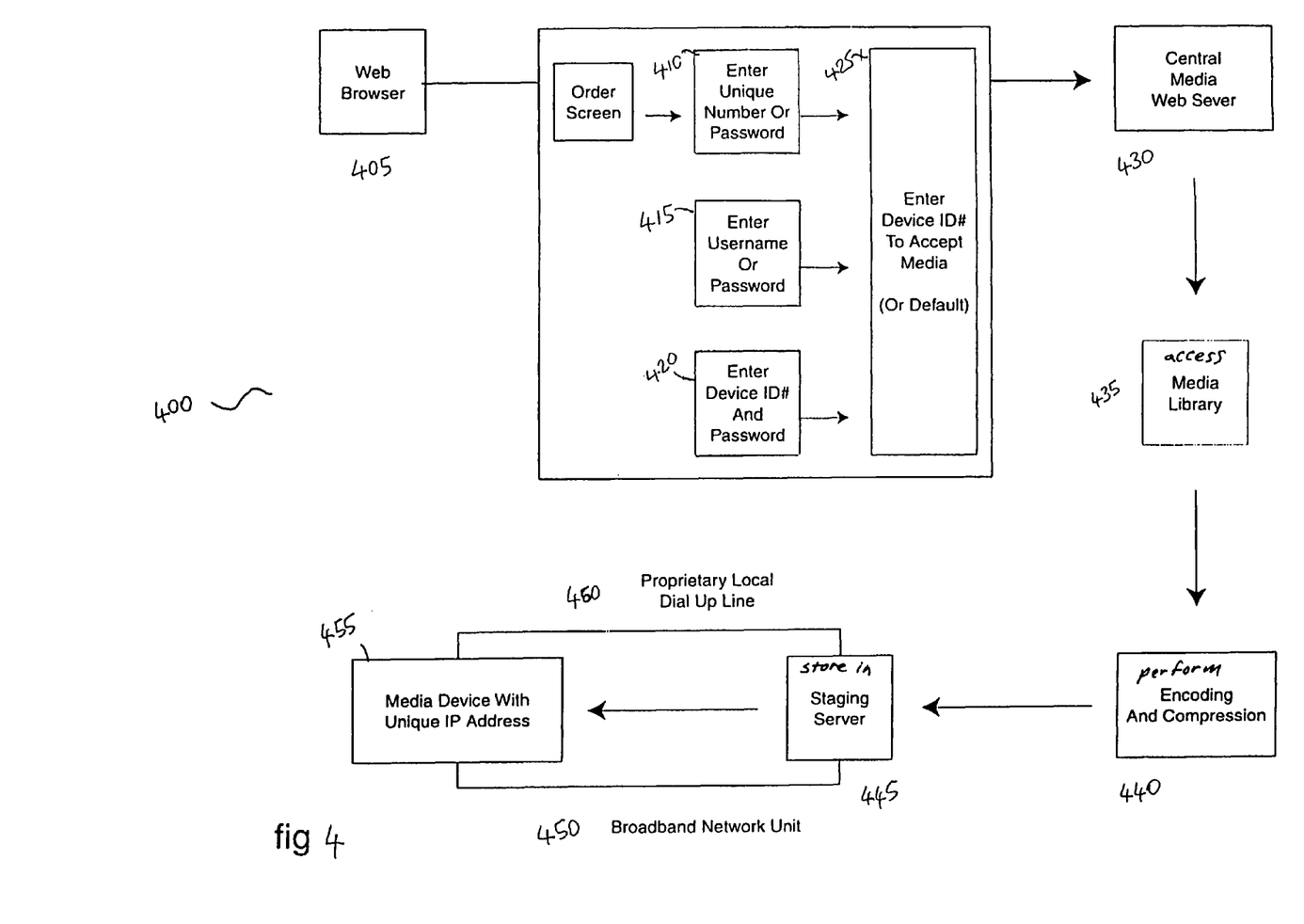
FIG. 4 illustrates an operation for browsing and ordering media through a web server according to embodiments of the present invention.

FIG. 4 illustrates an operation for downloading a media file using a web browser to find media for the unit. The user initially accesses the main media database on the desired web server using a standard web browser 405 and searches the desired databases using a variety of queries. For example, users can search for their favorite artist, favorite song, songs or recordings performed within a certain time frame, songs or artists that are similar to other songs or artists. The central web server responds with a list of results that match the user's queries. If the user finds something desirable, the user can order the desired digital work, but the user first needs to be identified by the central ordering server as a subscriber for billing purposes and to know which unit to send the media. The user can be identified by the user entering a unique identification number at 410 received at registration of the unit, entering a unique username and password at 415 or entering the unit's identification number and password at 420. Once the user logs on to the web ordering server, the user may request a desired media file to be downloaded to the unit at 425. There will be times that a user will desire to download media to a different unit than usual, so the system will be flexible enough to embrace these requests. Every unit, if necessary, has a unique identification number, much like every house has a unique physical address.

Once the central media web server 430 receives the user's request, the media web server pulls the necessary media from a media library at 435 and sends the files through a real-time encoding and compression system 440. The encoding and compression specifications are flexible. A variety of encoding and compression techniques may be supported. Once the media is encoded, it is sent to a staging server at 445 to connect directly to the specified unit for downloading or to wait for a request from the unit for downloading. If the unit is attached to a high-speed, broadband line to the Internet attached to the unit's Ethernet connection, the unit will have its own Internet Protocol address (IP address). The staging server can then immediately associate the unit's IP address with that same unit's unique ID number and begin transferring the media files at 450. However, if the unit uses its modem connection at 460, the unit will then automatically dial into the local, proprietary connection at a later time, such as at night (or, if forced by the user, it will dial up when commanded) and pull the files from the staging server 445.

For example, if a user is in another city and uses the web to make an order for some digital music, the staging server will know if the user's unit has its own IP address or if it uses a modem (the unit will be inaccessible by the staging server if the unit uses a modem). If the unit has an IP address, the staging server will send the media files directly to the unit. If the unit uses the modem, the staging server knows to wait for the unit's call. Later, the unit will automatically connect to the staging server and see whether any new media files are available for downloading. Since there is in this example, the unit will begin downloading the previously ordered, presently available media files.

Figure 5:
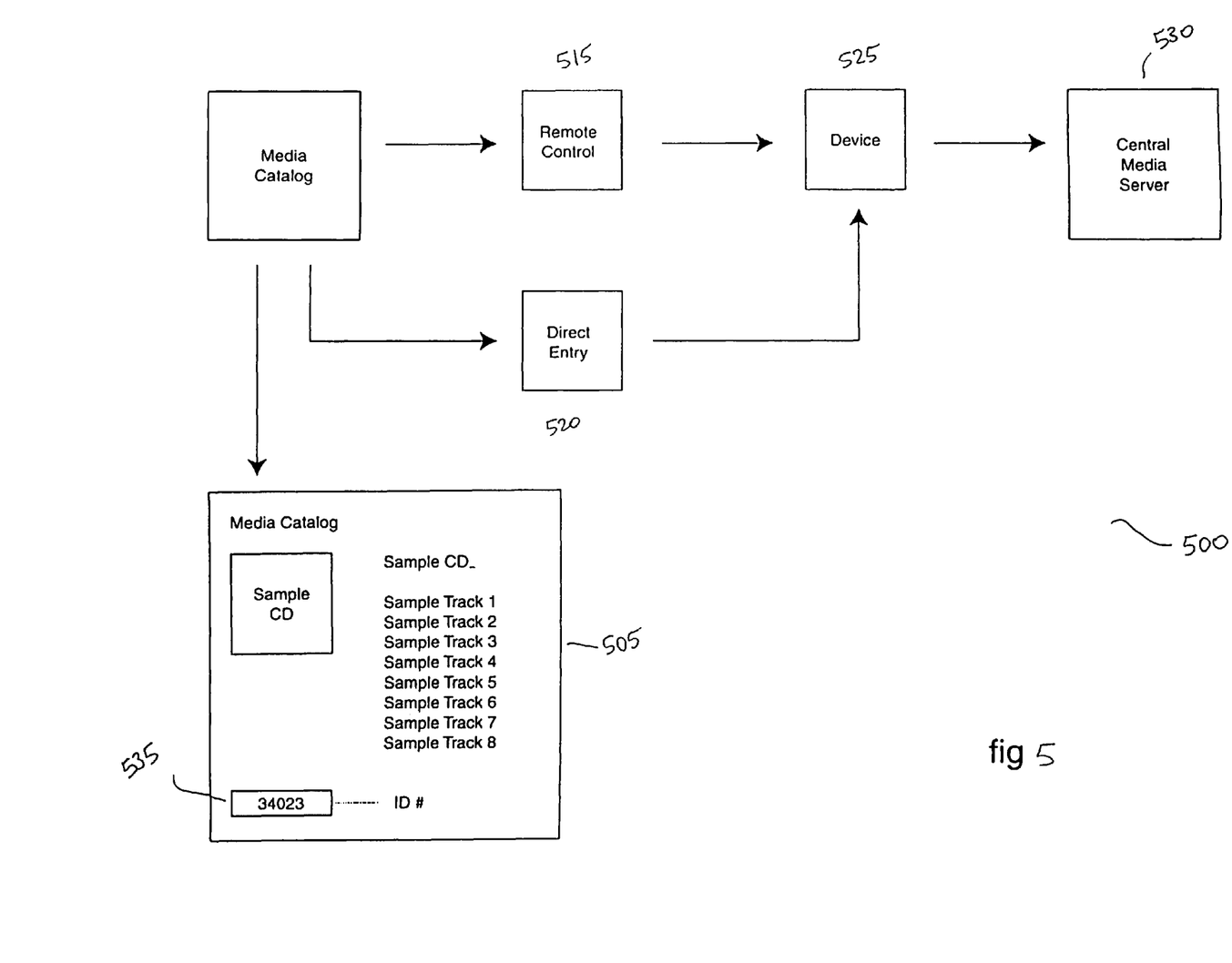
FIG. 5 illustrates an operation browsing and ordering media through the player's remote control according to embodiments of the present invention.

FIG. 5 illustrates another method for downloading digital media files to the unit by using a physical catalog hardcopy that the user can receive in the mail (or in a store or by other methods). The media catalog 505 lists some or a majority of the media on the server in various ways. The user simply identifies an item and makes a note of that item's ID number and then, either with a remote control 515 or by direct entry on the unit's screen 520, enters the ID number into the unit 525 and requests to download the media. The unit 525 contacts the central media server 530 and requests the media based on the media ID number 535. The central media server, similar to the central media web server described with reference to FIG. 4, performs similar operations described above for accessing, compressing and delivering the media to the requesting unit.

Figure 6:
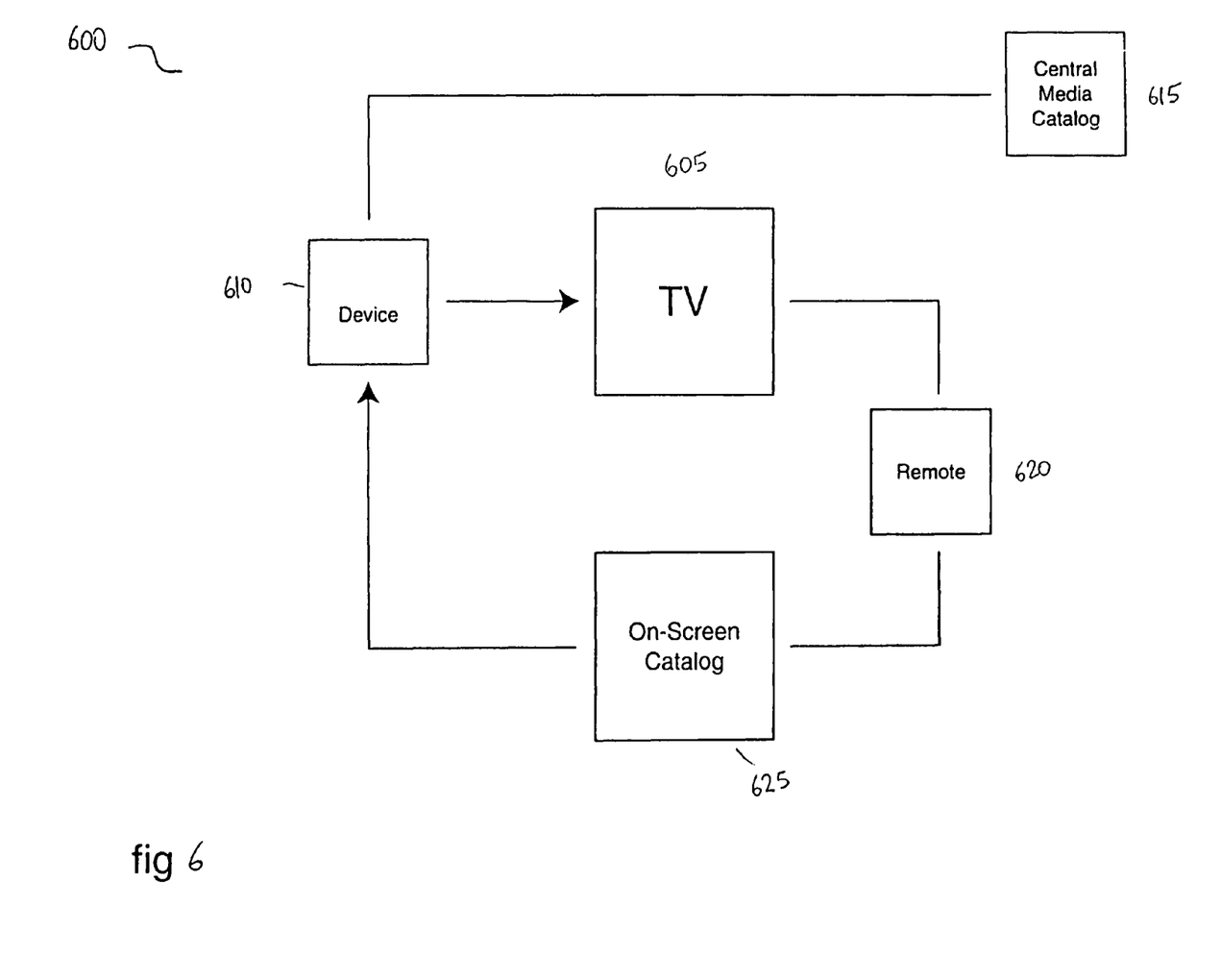
FIG. 6 illustrates an operation for browsing and ordering media through the on-screen catalog according to embodiments of the present invention.

As should be understood, a physical catalog is limited in its breadth and depth of material, thus another method of downloading media files is illustrated to FIG. 6. This method allows the user to access and download digital files to a unit by navigating the entire media catalog 615 on the central server through the unit. The unit's video output port is connected to a television 605, so as to present a visual representation of one or more database/libraries of media files in the media catalog. When connected to the central media catalog, the user is able to navigate the media catalog by manipulating navigation buttons on the unit. The user can then browse and search through the entire media catalog using the remote control 620 or touch screen interface 625 on the unit. The media may be downloaded using a similar mechanism as described hereinabove with reference to FIG. 4.

Figure 7:
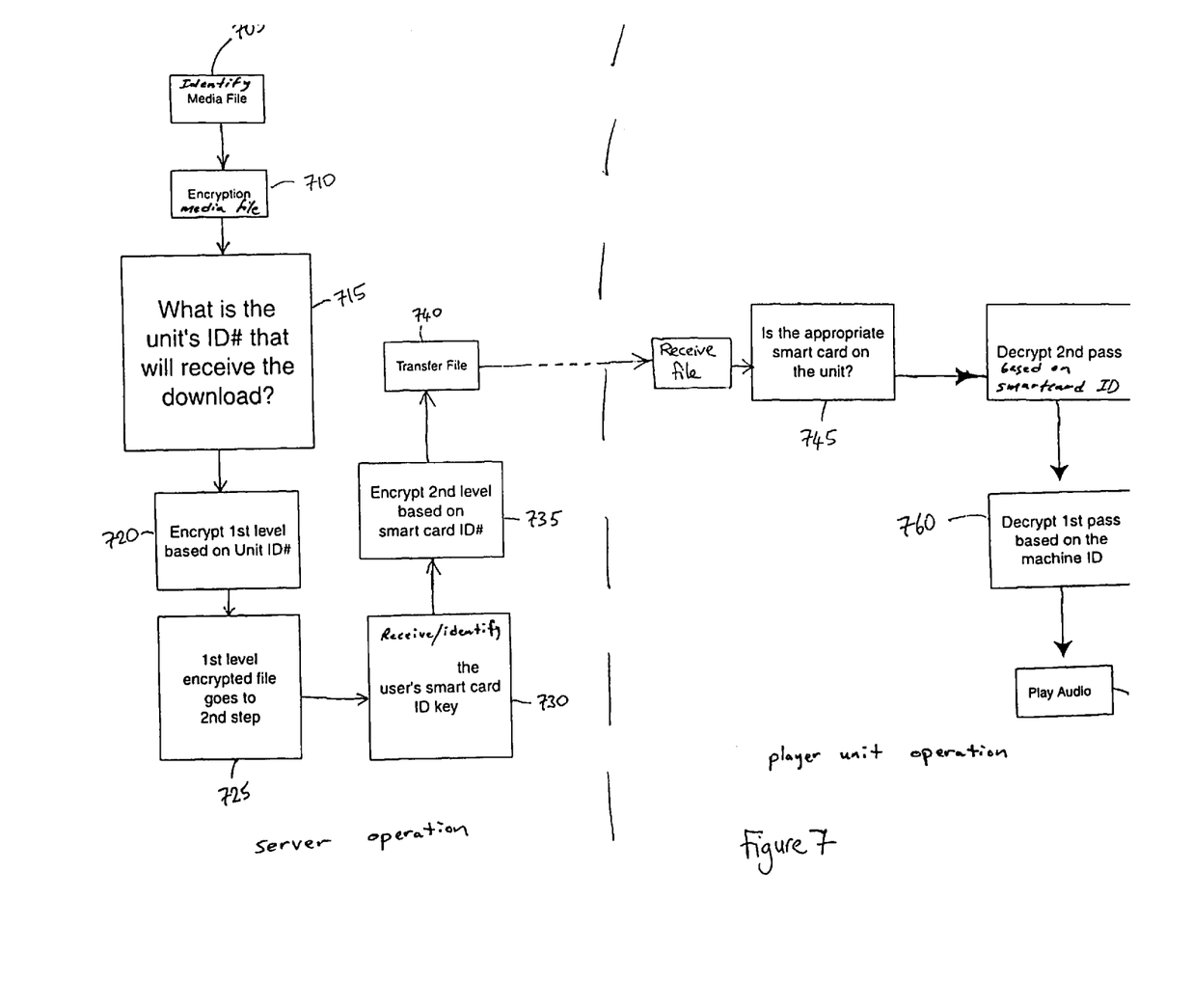
FIG. 7 illustrates an encryption/decryption operation of the media according to a preferred embodiment of the present invention.

In a preferred embodiment of the present invention, media is double-encrypted at the staging server 445 before being transmitted to the unit. The encryption used is preferably 128 bit, although this, like compression and encoding of media assets, is flexible depending on the security level. FIG. 7 illustrates the two levels of encryption in the staging server and the two corresponding decryption levels in the unit. The first layer of encryption at 720 is based on the specific unit that will receive the selected media file 705. The second layer of encryption at 735 is based on the user's smartcard ID number. The server reconciles the user's name with the user's smartcard ID key at 730 and then encrypts the media to this key at 735. The server then transfers at 740 the file to the specific unit making the request or queued to receive it. The unit then checks if the smartcard is in its reader at 745. If there is a smartcard, it verifies that the smartcard ID can decode the encrypted file with a checksum. This ensures that only the specific smartcard that the media is keyed to can unlock the file. Other smartcards having different key values stored therein will not work. If the smartcard is successfully inserted into the unit, the unit decodes the second encrypted pass at 750 and then decodes the first encrypted pass at 760. The unit then audibly plays the media file at 765. All decryption is done immediately prior to the time of playback time. The original media files remain encrypted on the unit and are unplayable if the smartcard is removed. If the unit cannot find the smartcard, it will prompt the user for one.

The music or video content that someone owns is not necessarily tied to their specific unit but rather is tied to the user's smartcard. For example, a user who has a library of 500 songs on one particular unit can remove the smartcard and then attach that smartcard to another unit. The new unit, consequently, has privileges and decryption abilities to play all 500 songs in the library. This will, of course, probably demand downloading the files from the central server for this new machine. In this example, the old machine, without the smartcard, is unable to play any of the 500 songs.

Figure 8:
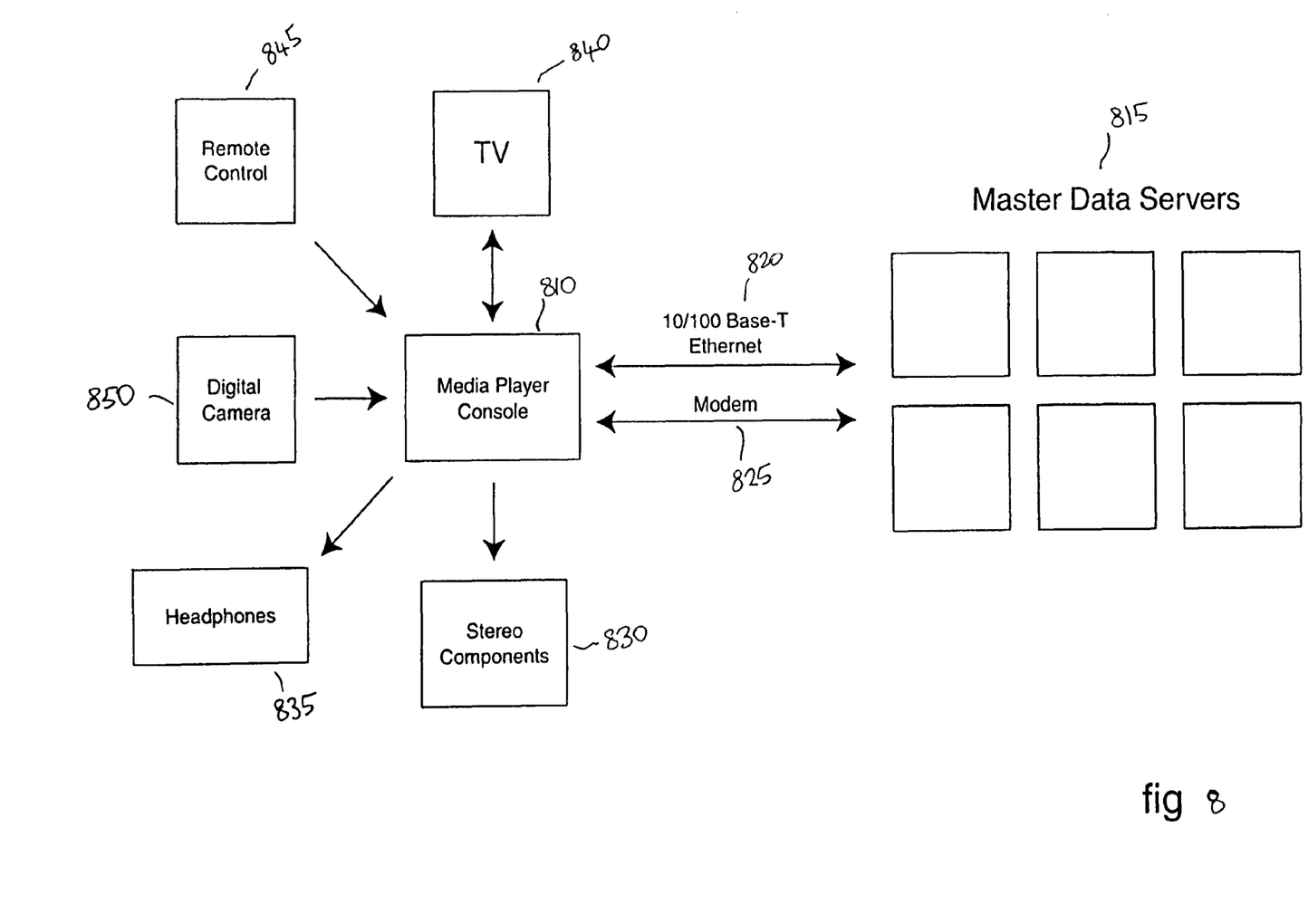
FIG. 8 illustrates the connection of the console version of the player unit with system components.

Once the media is downloaded to the unit, the user can listen, view, and control it in various ways. FIG. 8 illustrates the operation and interworking of the console version of the player unit, described with reference to FIG. 2. The unit 810 receives the media from the Master Data Servers 815 on either a broadband connection to the Internet 820 or modem 825. The smartcard, inserted within the unit, unlocks the audio decryption so that the user can play back the selected audio file through stereo components 830, that are hooked up to the RCA analog audio port on the unit or through headphones 835. The user can view the currently playing music using the television/monitor 840 which provides a visual display of unit's library of media files. Using the remote control 845, the user can navigate through the unit's media file library. Here the user has the flexibility of searching for any artist, track, CD name, song title, date, and genre of media on the unit. The user can also sort song tracks into unique playlists, for example, a playlist of Jazz, Classical, or Blues music. These playlists are automatically indexed to the smartcard so that the user can attach the smartcard to another, different unit and pull up the playlists he has already created.

A digital video camera or other video source that supports IEEE-1394 (850) connects to the IEEE-1394 connection on the media player to supply video signals and compress digital video, as will be explained with respect to the embodiments of FIGS. 10-13.

Figure 9:
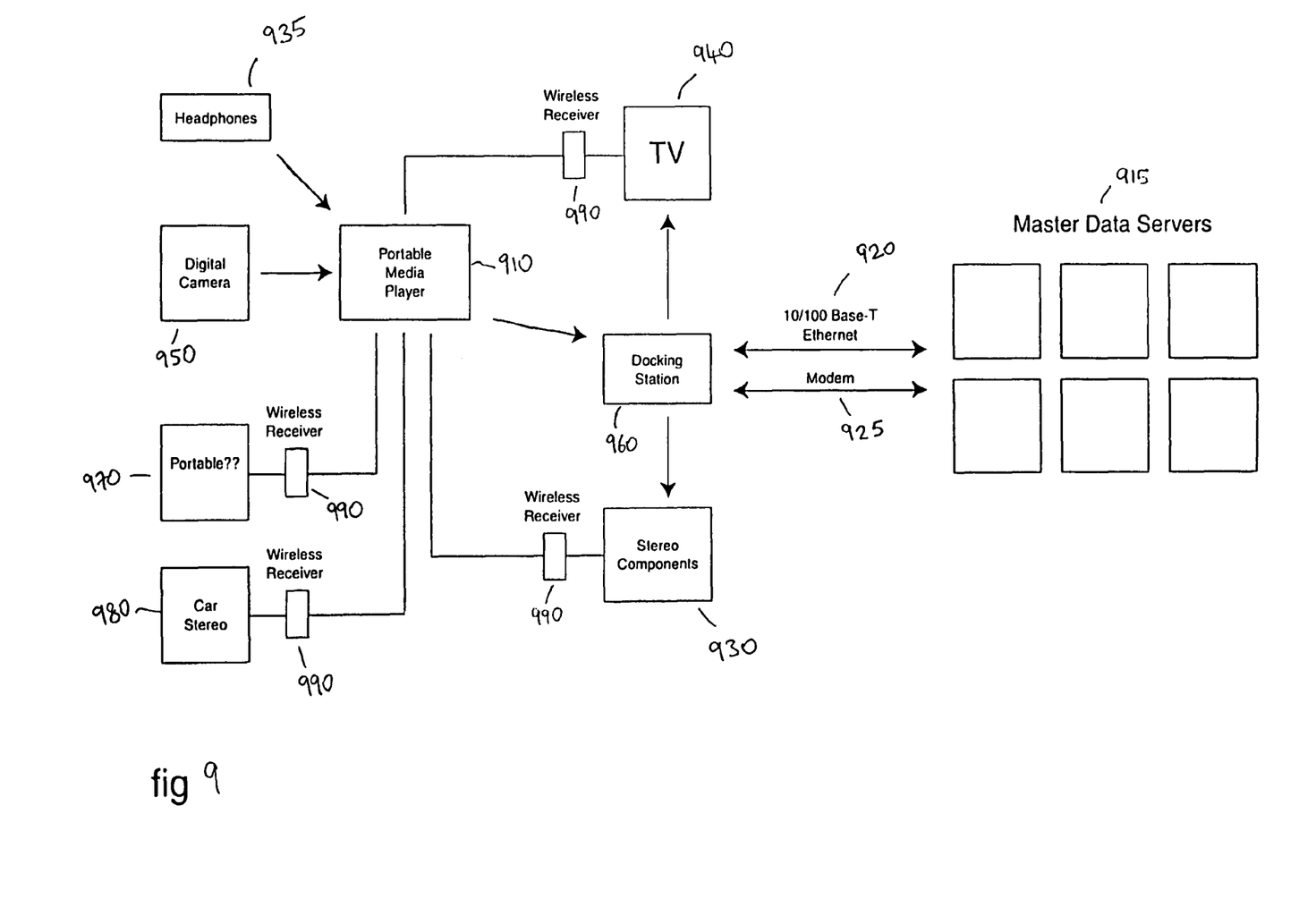
FIG. 9 illustrates the connection of the portable player unit with system components.

FIG. 9 illustrates in greater detail the portable, wireless unit according to the preferred embodiment of FIG. 3. The portable player unit 910 connects to a docking station 960 to download media from the Master Data Servers 915. The docking station 960 is a cradle that the unit 910 rests in which connects to the server using either the broadband 10/100 Base-T Ethernet connection 920 or a modem connection 925. The docking station has RCA audio out and video out as well as an A/C connection for power. While the unit is on the docking stations cradle, the user can listen or view media as it is transferred through these analog connections to the television 940 or to the stereo system 930. The docking station also supplies power to recharge the battery on the portable unit.

If the portable unit is removed from the docking station, it uses a wireless network to broadcast its content to various receivers 990. The receivers 990 are modular attachments that connect to the analog audio inputs on a variety of units, mainly television 940, stereo components 930, portable miniature audio units 970, and car stereos 980. For example, when a user is listening to his portable unit through headphones 935 and he walks within range of a receiver attached to his stereo system and unplugs his headphones. The portable unit immediately senses the modular wireless receiver 990 attached to the stereo 930 and begins transmitting the media to that receiver. The wireless attachment receives the signal and sends the analog audio in to the stereo system where the user begins to hear the music over the external speakers in the room. If the user moves from his stereo to his car, and if the car has a wireless receiver 990 attached to its car stereo system 980, the car speakers will begin to play the music as soon as the user enters the range of that car's wireless receiver.

As is described hereinabove, the unit's main functionality is for audio. However, as will be shown hereinafter with reference to FIGS. 10-12, the unit has a substantial communicative ability with video messages, which may use the same technology and encryption as music.

Figure 10A:
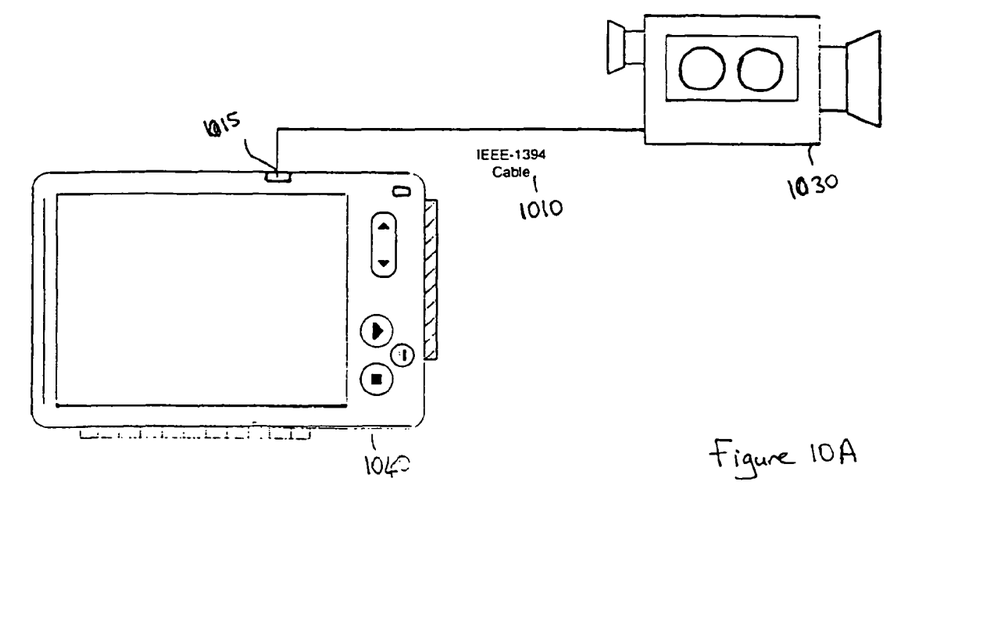
FIGS. 10A and 10B illustrate the connection of a digital camera to the player unit according to a preferred connection of the present invention.
Figure 10B:
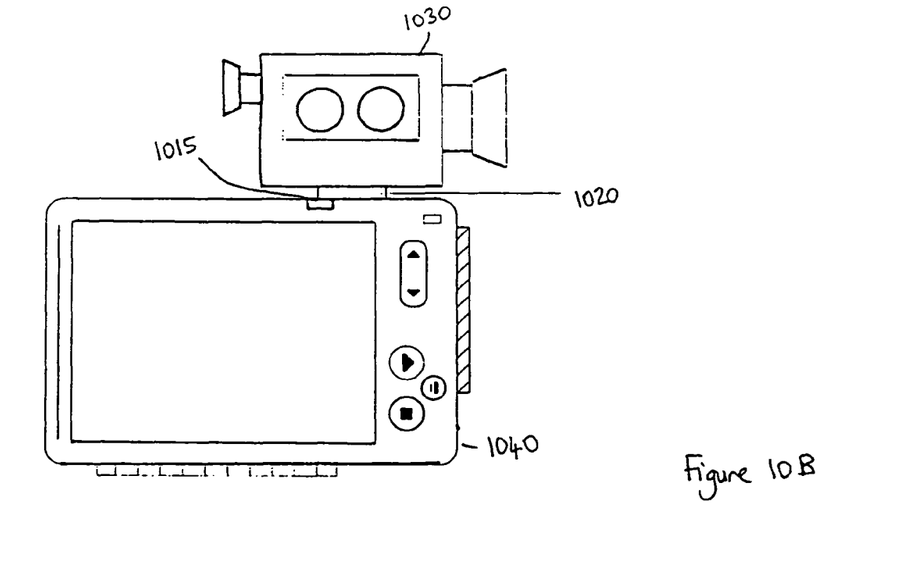

FIGS. 10A and 10B illustrates a digital camera 1030 being connected to the unit according to a preferred embodiment of the present invention. Using, an IEEE-1394 compliant digital video camera, a user can have the unit acquire video content for compression and delivery to other users. According to a preferred embodiment of the present invention, the digital camera can be connected using a IEEE-1394 cable 1010 between the digital camera 1030 and the unit 1040, as illustrated in FIG. 10A. The unit 1040 immediately sense that the camera 1030 is attached, and the user can control the camera, both searching the tape and capturing content, from the unit's interface. Alternatively, the camera may have a modular attachment 1020 that connects physically to the unit 1040 through the IEEE-1394 port 1115. In this case, the camera may be nothing more than a simple camera and network attachment. The unit itself may digitize the footage and controls the lens. The unit itself will, as suggested hereinabove with reference to the audio feature of the unit, holds a finite amount of video footage due to the limited capacity of the hard drive and the compression technology utilized.

Figure 11A:
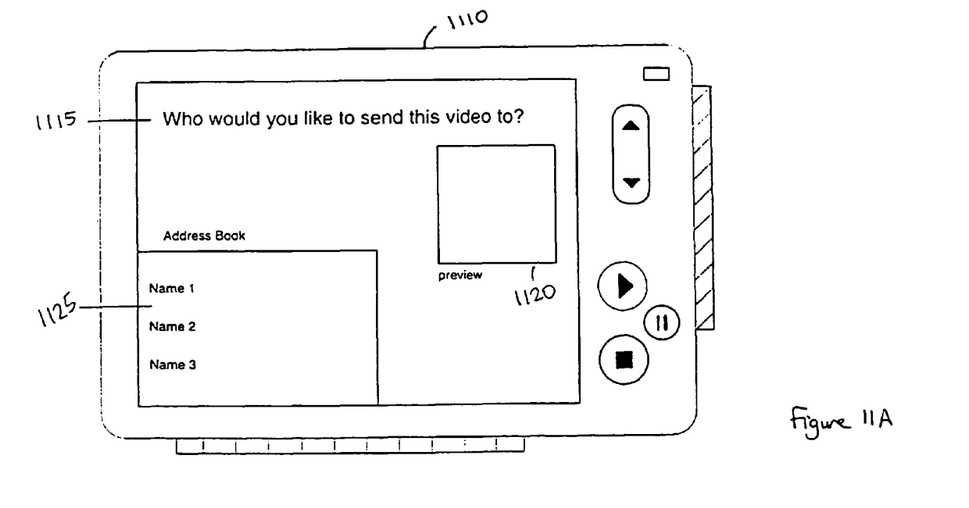
FIGS. 11A and 11B illustrate an operation for sending video by the player unit.
Figure 11B:
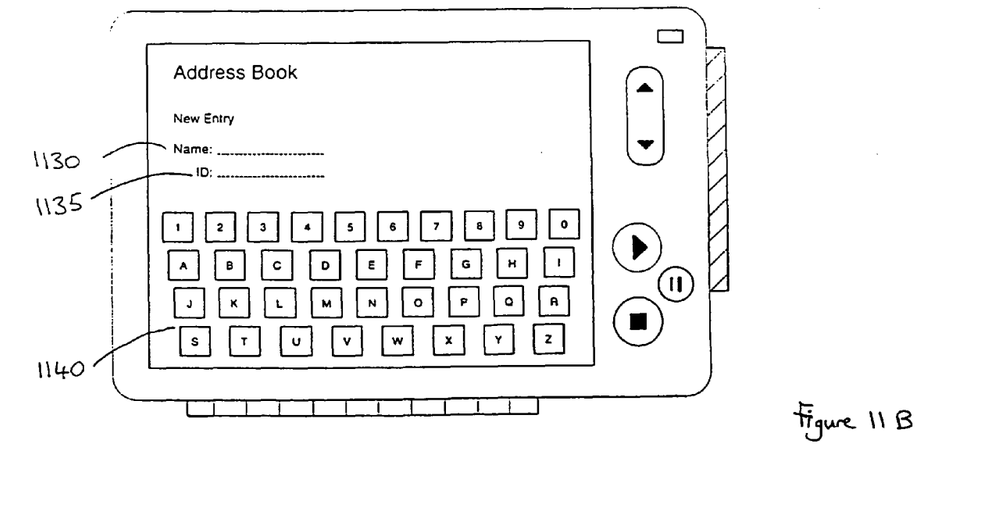

When the video is on the unit, the user is asked for the video's destination 1115, as shown in FIG. 11A. The user can watch another preview of the video 1120, this time in a small window on the unit's display 1110 and select a name from the unit's address book 1125. According to a preferred embodiment of the present invention, the window size for previewing the video on the display unit can be configurable by the user according to his/her preference. The video may be sent to another user in the address book of the unit. The address book is initially empty; so the user needs to input names 1130 and unit ID numbers 1135 into the book in order for the unit knows where to send content, as illustrated in FIG. 11B. The user does this by entering names 1130 and unique unit IDs 1135 using the on-screen keyboard 1140. This feature, as well as other features, as suggested hereinabove may work in both the console and portable unit configurations.

Figure 12:
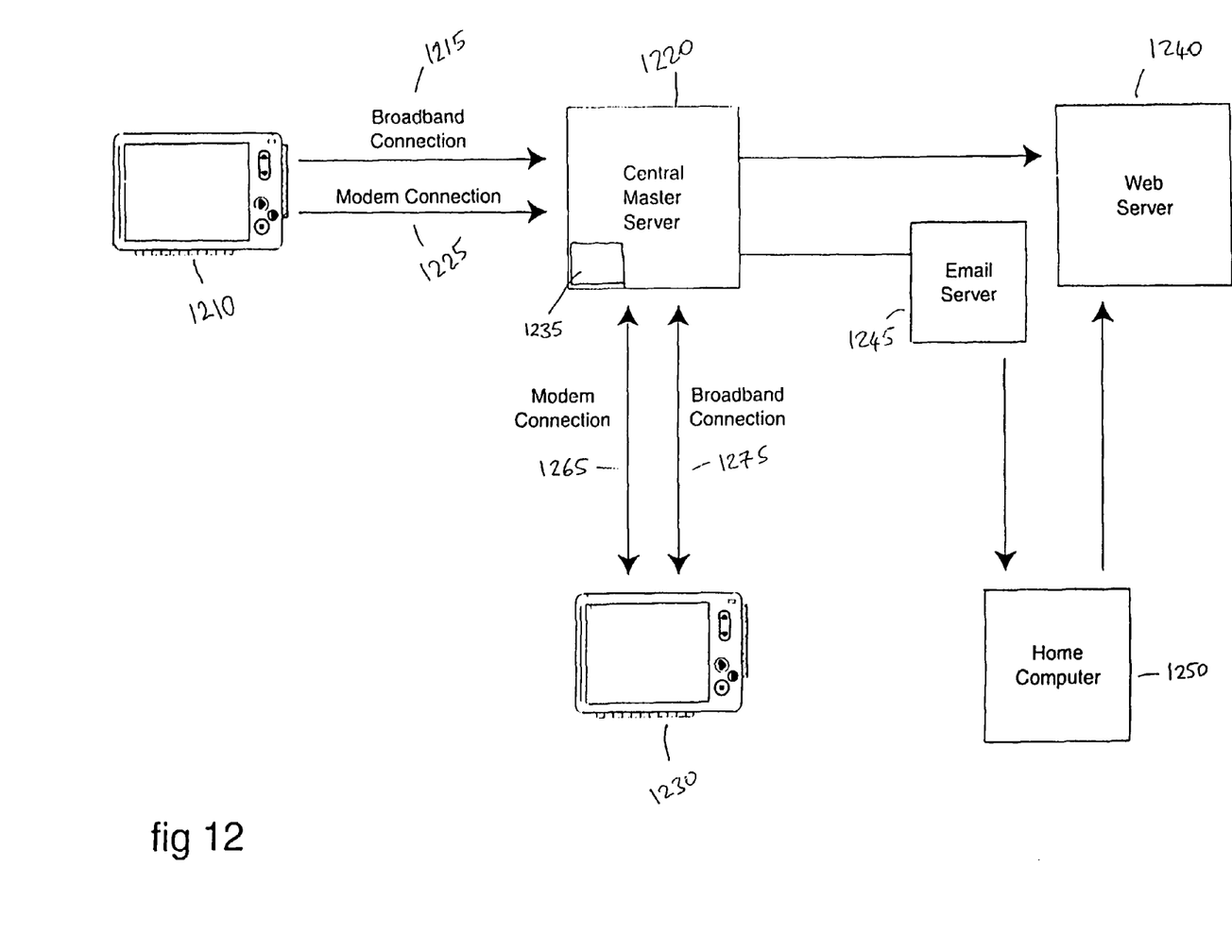
FIG. 12 illustrates an operation for the delivery of the video according to a preferred embodiment of the present invention.

FIG. 12 illustrates the video transfer between the units. The user can send the video immediately or delay the transmission until late that night to avoid trying up the phone line. This depends on the network connection and bandwidth speed. This choice is preferably done to reduce bandwidth consumption during peak hours. For example, if the user has a video file that is 10 megabytes in size, that file might take a substantial amount of time to transfer over the unit's 56k modem, tying up the user's phone line for that extended period. This feature gives the user the choice to send the file late at night or very early in the morning when the risk of the user needing the phone line for a voice call is much smaller. Once the unit 1210 sends the video, it is temporarily stored on the Master Central Server 1220 where it waits to be downloaded by the destination unit 1230. The unit 1210 with the original video content compresses and encodes the video and then either sends the video immediately on the broadband connection 1215 or delays sending until later to use the modem connection 1225. Once the video content arrives at the Central Master Server 1220, it is stored in a temporary area 1235. If the user who originally made the video has requested the video to be sent to a web page, the Central Master transfers the content to a web server 1240 and then sends an e-mail from an e-mail server 1245 to the destination user's address. The destination user then can access the web page through a personal computer 1250 at any time.

If the original video creator has requested that the video be delivered to another unit instead of a web page, the Central Master Server 1220 either waits for a summons from the destination unit (this will happen during the nightly dial-up 1265) or, if the destination unit has a unique IP address and is on a broadband line 1275, the server will send the file immediately to the receiving unit 1230. The destination unit now has a video waiting on the Central Server, the server then sends a message to the unit informing it of the awaiting video. As soon as the destination unit receives the message, an alert light glows on the receiving unit, indicating to the user that a new video message is waiting. The user can then request the video message to be downloaded to their unit immediately or wait to download the message later, as described above. The user can then watch the video message on the unit's screen or, as will most certainly be the case with console units, watch the video message directly on the television through the video out connection. The user then has the option, much like e-mail, to respond to the video message with a new message, to delete the message from the unit, or catalog the message, depending on hard drive space.

As should be clear, video message content is temporal and transitory and requires server-side hard drive space for a limited amount of time. Users can easily save these video messages to a video tape or other archival system.

According to a preferred embodiment of the present invention, the unit may be flexible in its development and operation and have the capability for upgrades. Moreover, the user interface such as the television navigation screens and the on-screen look and feel should also be flexible. For instance, semi-customizable user interfaces "Skins" can be implemented in the player unit.

It should be understood that although the MP3 standard has been illustrated, the present invention offers a methodology applicable to other digital standards.

The unit enables secure and simple digital distribution of media and relieves the control of these types of digital assets from personal computers, thus as described hereinabove controlling the reproduction of digital copyrighted works. The unit can be seen as a dedicated entertainment, digital delivery consumer unit. The unit is flexible in construction and simple in use.

The unit, according to a preferred embodiment of the present invention, is flexible to read various types of audio and video which allows the compressed files sent from the central server to be in different formats. The unit is able to play the music or video using a variety of techniques.

The unit may, according to a preferred embodiment of the present invention, include a CD-player for audio playback from regular CDs or from custom MP3 CDs that are recorded and encrypted according to the techniques set forth in the present invention. Thus, the custom MP3 CD can be played only using a unit containing the user's smartcard.

It is understood that cards other than smartcards may be used by the unit for storing the personalized key used in performing the encryption and decryption operations. A smartcard may be a Personal Computer Memory Card International Association (PCMCIA) card, Japan Electronic Industry Development Association (JEIDA), etc.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for providing digital media files, said method comprising the steps of:
   receiving from a user two encryption keys;
   double encrypting digital media files based on said two encryption keys; and
   transmitting to said user the encrypted digital media files, wherein a first of said encryption keys is associated with said user and the second of said encryption keys is associated with a user device to which said encrypted digital media files are transmitted.

2. The method according to claim 1, wherein said receiving step further comprises the step of:
   receiving identification of said digital media files.

3. The method according to claim 1, further comprising, prior to said transmitting step, the step of:
   storing said encrypted digital media files in a staging server, said digital media files awaiting a connection by said user to be transmitted.

4. The method according to claim 1, further comprising, prior to said step of transmitting, the steps of:

encoding said digital media files; and compressing said digital media files.

5. The method according to claim 1, wherein said step of encrypting comprises:

performing a first encryption operation on said digital media files based upon a first of said encryption keys; and performing a second encryption operation on said digital media files based upon a second of said encryption keys.

* * * * *